United States Patent [19]

Nakamura

[11] Patent Number: 4,704,616

[45] Date of Patent: Nov. 3, 1987

[54] APPARATUS FOR ELECTROTHERMAL PRINTING

[75] Inventor: Haruo Nakamura, Suwa, Japan

[73] Assignee: Seiko Epson Kabushiki Kaisha, Tokyo, Japan

[21] Appl. No.: 898,852

[22] Filed: Aug. 19, 1986

Related U.S. Application Data

[63] Continuation of Ser. No. 658,089, Oct. 5, 1984, abandoned.

[30] Foreign Application Priority Data

Oct. 5, 1983 [JP] Japan ............................ 58-186496
Mar. 8, 1984 [JP] Japan ............................ 59-44372

[51] Int. Cl.$^4$ ............................................ G01D 15/10
[52] U.S. Cl. ............................ 346/76 PH; 219/543; 346/162
[58] Field of Search ............ 346/76 PH, 76 R, 151, 346/155, 162, 163, 139 C; 400/120, 124; 219/216, 543; 427/53; 358/298

[56] References Cited

U.S. PATENT DOCUMENTS

| | | | |
|---|---|---|---|
| 3,744,611 | 7/1983 | Montanari et al. | 346/76 R |
| 4,030,588 | 6/1977 | Hanagata et al. | 346/76 PH |
| 4,071,849 | 1/1978 | Koyano et al. | 346/76 PH |
| 4,151,311 | 4/1974 | Feldstein | 427/53 |
| 4,345,845 | 8/1982 | Bohnhoff et al. | 400/120 |
| 4,368,491 | 1/1983 | Saito | 346/76 PH |
| 4,399,749 | 8/1983 | Arai | 346/76 PH |
| 4,423,424 | 12/1983 | Takayama | 400/120 |
| 4,516,135 | 5/1985 | Todoh | 346/76 PH |

OTHER PUBLICATIONS

"Universal 'Printhead'", by Kuntzleman et al, IBM Tech. Disclosure Bulletin, vol. 25, No. 4, Sep. 84, pp. 2117–2119.

Primary Examiner—Arthur G. Evans
Attorney, Agent, or Firm—Blum Kaplan

[57] ABSTRACT

An apparatus for electrothermal printing using an ink film which has a layer of fusible ink on a resistive layer. The resistive layer is contact by a plurality of stylus electrodes which are formed on an insulating substrate. A potential difference applied to pairs of adjacent electrodes heats the resistive layer, allowing fusible ink to be transferred to a transfer sheet to form picture elements. A plurality of picture elements can be produced simultaneously by dividing the styluses into N groups, represented as $N \times J + 1$, $N \times J + 2$, etc., where J is 0, 2, 3, . . . , and N is an odd number greater than 3. The groups are printed, one after the other, by energizing styluses which correspond to the picture elements to form a picture.

21 Claims, 48 Drawing Figures

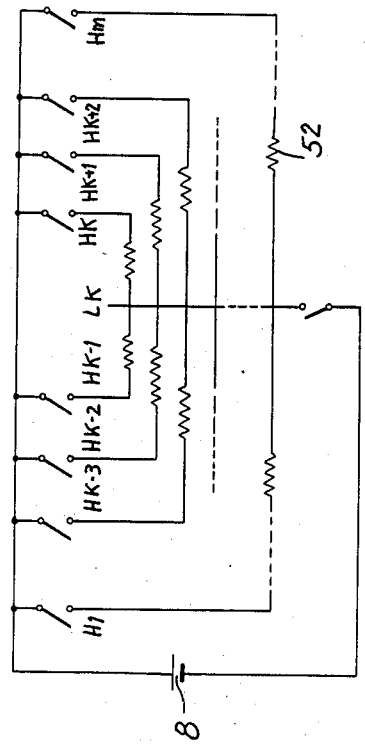
FIG. 8
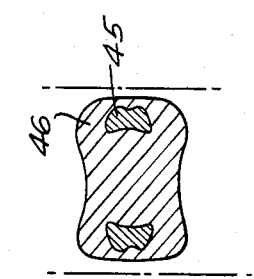
FIG. 9
PRIOR ART
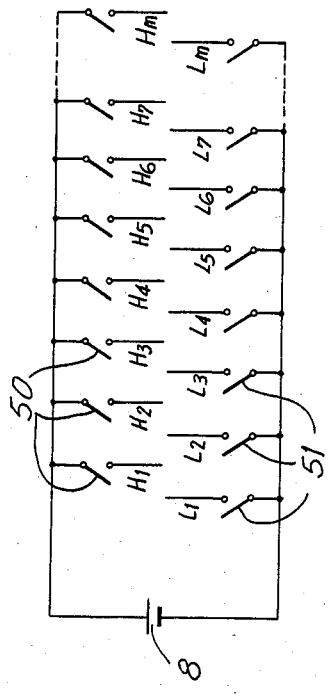
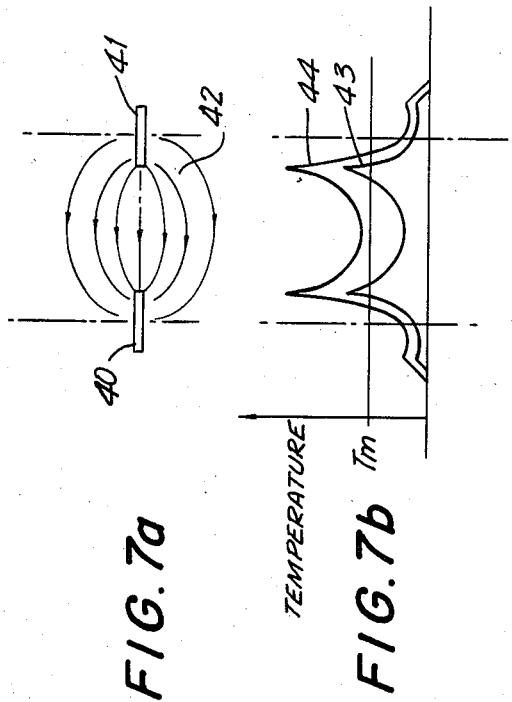
FIG. 7a
FIG. 7b
FIG. 7c FIG. 26
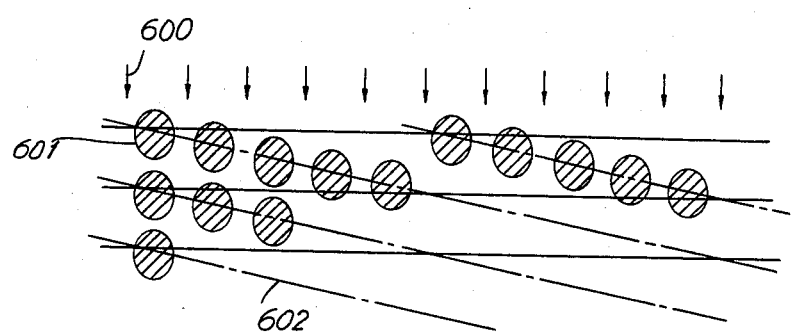
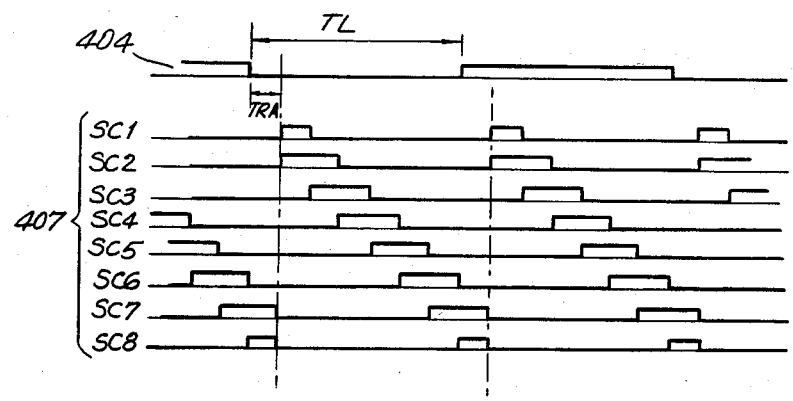
FIG. 27

APPARATUS FOR ELECTROTHERMAL PRINTING

This is a continuation of application Ser. No. 658,089, filed Oct. 5, 1984, now abandoned.

BACKGROUND OF THE INVENTION

The present invention relates to a printing apparatus which is capable of printing a gray scale and, more particularly to a printing apparatus in which a thermal transfer film of an electrothermal type has the capability of providing a gray scale. The printing apparatus of the invention can deliver printed matter such as a color reproduction or picture.

At the present state of development of the information art, display devices which deliver picture information are being improved to be capable of color reproduction. Several difficult technologies are proposed as a basis of such color printing. Such technologies include methods such as ink jet, thermal transfer and wire dot printing. Although these methods have some disadvantages, it is possible to adapt them for use in apparatus for the printing of several colors (about seven to sixteen colors) and such methods have been put into practical use. However, in printing apparatus such as these, it is difficult to print a picture image of a color television display and to provide an economical and dependable printing apparatus having the requisite high printing speed and quality. This is because each of the aforesaid methods use a two-level recording process. In some circumstanses, a three or four-level recording method is also possible in which one dot is printed or is not printed. When representing a gray scale, therefore, it is necessary to use a signal process, such as a dither method or a matrix area gray scale method, in which several dots are combined into one unit. These methods increase cost and decrease printing speed and quality.

SUMMARY OF THE INVENTION

Generally speaking, a printing apparatus in accordance with the invention is provided having a recording head having a plurality of recording styluses arranged in a line. A switch associated with each stylus enables that stylus to be connected to a source of potential. The potential which is applied to one stylus is made higher than that which is supplied to its adjacent neighbor, so that every other stylus can be connected to one potential and the remaining styluses can be connected to a different potential. The styluses are placed in contact with the resistive layer of an ink film and the resistive layer is heated by the passage of ohmic current between adjacent styluses when the potential difference is applied to them. The resulting heat melts a fusible ink which is carried by the ink film, permitting transfer of the melted ink to a transfer paper as an element of a picture image. The printing apparatus includes circuitry for dividing the styluses into N picture element groups, represented as $N \times J+1, N \times J+2, \ldots N \times J+N$, where, given a number n of picture elements in a line, J is 0, 1, 2, 3, ... $(n/N-1)$ and N is an integral number an odd number greater than 3. By means of the circuitry, current is fed to each of the N groups in succession, enabling a substantial number of picture elements to be produced at a high speed.

Accordingly, it is an object of the invention is to provide a printing apparatus which can perform gray scale and full-color printing at high speed and with high reliability at low cost.

A further object of the invention is to provide an electrothermal printing apparatus for printing an image of a color television picture.

Still another object of the invention is to provide an economical printing apparatus which is capable of high printing speed, high quality and high reliability without the use of expensive silver-halide film.

A still further object of the invention is to provide a printing apparatus capable of delivering color printed matter, such as a printing apparatus for a color printer or a hard copy apparatus for a color graphic processor.

The invention accordingly comprises the features of construction, combinations of elements, and arrangement of parts which will be exemplified in the constructions hereinafter set forth, and the scope of the invention will be indicated in the claims.

For a fuller understanding of the invention, reference is had to the following description taken in connection with the accompanying drawings, in which:

BRIEF DESCRIPTION OF THE DRAWINGS

FIGS. 1a, 1b, 1c and 1d are sectional views, in of portions of ink films useful in the present invention;

FIGS. 7a, 7b, and 7c illustrate the function of the present invention in the making of an area gray scale recording using the recording head of the present invention;

FIG. 8 is a circuit diagram illustrating the manner of connection of the switches and the recording styluses in accordance with the present invention;

FIG. 9 shows the location of equivalent resistances existing between each recording stylus in the present invention;

FIGS. 23, 24, 25 and 27 show operating signals in the embodiment of FIGS. 14–22;

FIG. 26 shows an arrangement of picture elements formed in accordance with the present invention;

FIG. 27 is a chart showing the timing of a recording sequence selection signal;

DETAILED DESCRIPTION OF THE INVENTION

Figure 1A:
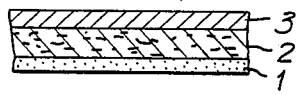

A known electrothermal transfer recording method which provides multi-level recording and color printing is shown in FIGS. 1 and 2.

Figure 1B:
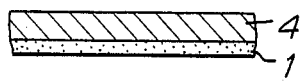
Figure 1C:
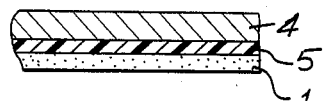

FIG. 1 shows an example of an ink film layer construction which is used in electrothermal transfer recording. In it, a fusible ink layer 1 is formed by dispersing a pigment, or both a pigment and a dye, in wax. Characteristically it fuses at about 60° C. Layer 2, a resin film, such as PET or a condenser paper, is used as an ink support layer. Layer 3 is formed by dispersing carbon powder in the resin and is conductive (hereinafter referred to as a "resistive layer"). Layer 4 (FIGS. 1b and 1c) is a resistive layer which is also used to support ink layer 1. A layer 5 (FIG. 1c) for preventing color turbidity is made of a resin with heat-resisting properties. The joule heat which is generated by current flowing through the resistive layer of any of these ink films causes the thermally transferable material in the ink layer to melt. When transferred to a transfer sheet, an image can be formed. The film layer constructions shown in FIG. 1 each have a characteristic resistivity which is important to equipment design, but is not necessary to the understanding and use of the invention.

Figure 3:
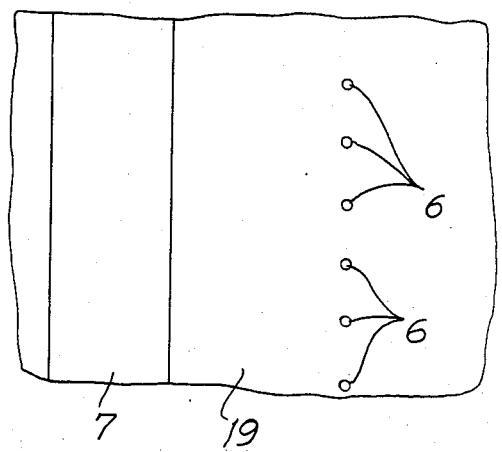
FIGS. 3 and 4 show a recording arrangement of the prior art and its equivalent circuit, respectively.
Figure 4:
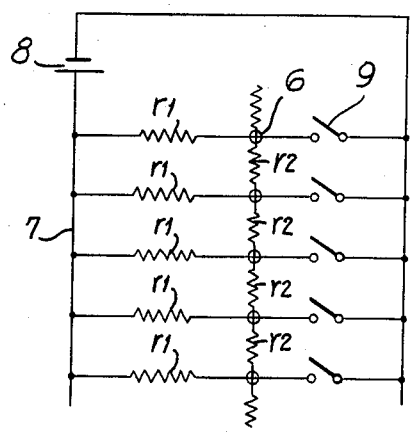
Figure 2A:
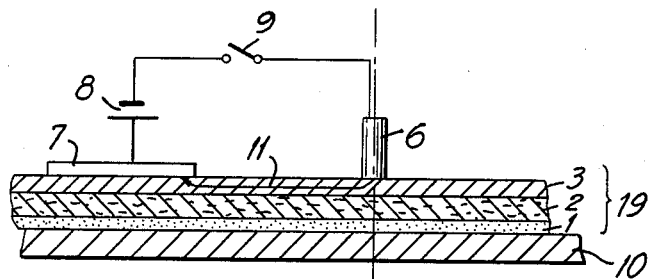
FIGS. 2a, 2b, 2c and 2d show a method of area gray scale recording using a recording head of the prior art.
Figure 2B:
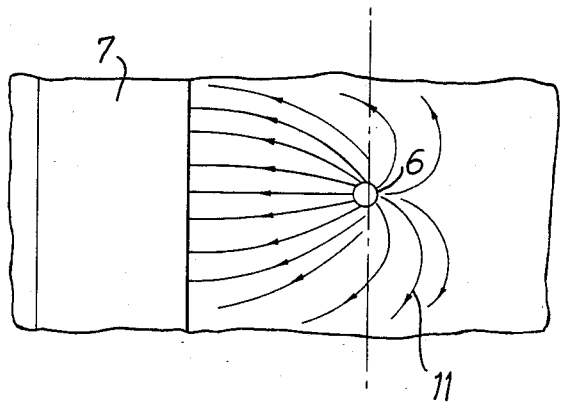
Figure 2C:
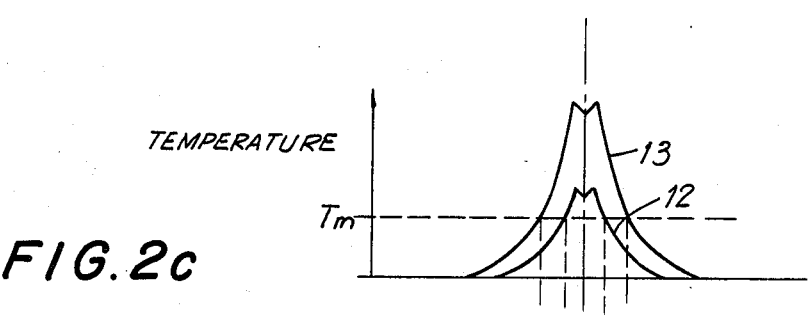
Figure 2D:
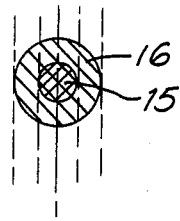

FIGS. 2-4 show the structure and the fundamental principle of operation of a known multi-level recording method. FIG. 2a is a cross-sectional view showing an ink film 19 having the construction shown in FIG. 1a, as well as showing an ink transfer sheet 10, a recording stylus 6, a common electrode 7, a power source 8 and a switch 9. Closing switch 9 causes current 11 to flow through resistive layer 3. FIG. 2b depicts the distribution of current flow 11 in resistive layer 3 when the voltage is applied between the stylus and the common electrode. The joule heat is proportional to the square of the current density and results in the temperature distribution depicted in FIG. 2c. The character of the temperature distribution depends on the period of time that switch 9 is closed; see curves 12 and 13 of FIG. 2c. Curve 12 represents the condition in which the period of time of closing switch 9 is shorter; e.g. the amount of heat released is smaller than in the condition represented by curve 13. Given the melting point Tm of the fusible ink, the fusible ink melts in the temperature region above Tm and is transferred to transfer sheet 10. The area of transferred ink is modulated as shown in areas 15 and 16 which correspond to the temperature distribution of curves 12 and 13, respectively. In this way, variation of the period of time of current flow enables multi-recording.

To make a recording at high speed, a plurality of the styluses is operated simultaneously to effect recording. FIG. 3 shows, schematically, an example utilizing a plurality of recording styluses 6, an ink film 19, and a common electrode 7. FIG. 4 shows a simplified equivalent circuit of the print head of FIG. 3. in which each recording stylus is connected to power source 8 through switch 9. An equivalent resistance r1 is shown lying between each recording stylus 6 and the common electrode 7. An equivalent resistance r2 is located between each adjacent recording stylus.

In the circuit of FIG. 4, with the exception of the case $r1 < < r2$, the amount and the current direction of current flow through each recording stylus depends on whether the switches are closed or opened; the current flowing through a particular recording stylus cannot be controlled by opening or closing only the switch corresponding to each recording stylus. Further, even in the case of $r1 < < r2$, it is very difficult to make electrical connections uniformly between the resistive layer and the common electrode or the many recording styluses shown in FIG. 3. Thus, to record using multiple-recording styluses with an ink film having the aforesaid resistive layer, the following two points are required: first, the electrical connections must be made more uniformly without any error; second, the recording should be performed with a plurality of recording styluses simultaneously.

The present invention, illustrated in FIGS. 5–31, meets these requirements.

Figure 5A:
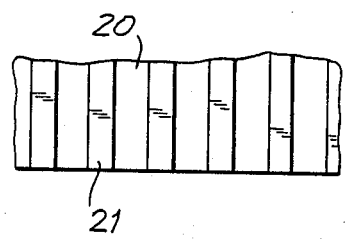
FIGS. 5a, 5b, and 5c show plan, end, and side views, respectively, of a recording head in accordance with the present invention.
Figure 5B:
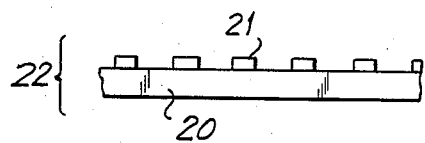
Figure 5C:
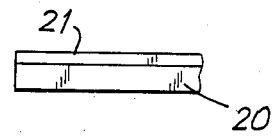

FIG. 5 shows a recording head 22 fabricated in accordance with the teachings of the invention. Because of its reliability, heat-resistance, and permanence, electrode substrate 20 is made of ceramic. More economical materials such as glass-epoxy can be used according to circumstances (see FIG. 31). A plurality of recording styluses 21 take the form of conductive strips on the substrate. The number of the recording styluses required is dependent on the number of recording signals to be used. For recording a television screen, about 500 recording styluses are necessary.

Figure 6:
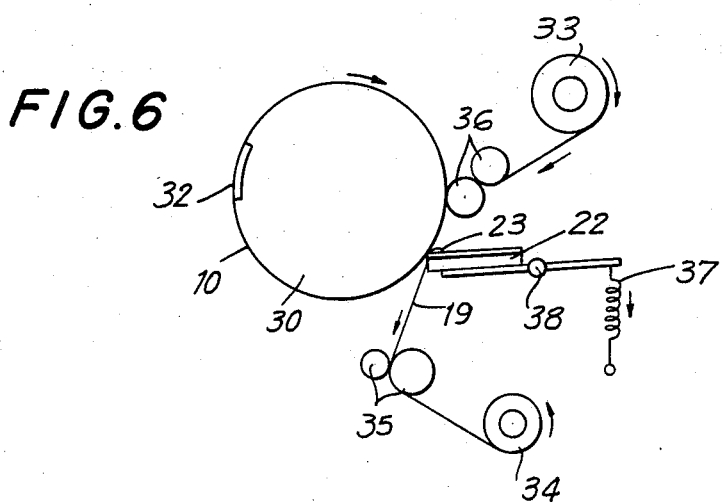
FIG. 6 is a schematic representation of printer showing the carrier system for the ink film and an ink transfer sheet as used in the present invention.

FIG. 6 shows a method of bringing ink film 19 into contact with recording head 22. A main roll 30 is formed of elastic material such as rubber, onto which an ink transfer sheet 10 is wound, being held by a fixture 32. Ink film 19 is unwound from reel 33 and is taken up by reel 34, travelling in the direction shown by the arrows. Rollers 35 and 36 are provided for guiding ink film 19. End portion 23 of recording head 22 is pressed against main roll 30 by a spring 37, being carried on a lever which is supported at a pivot 38. By using the method of FIG. 6 in which the recording head of FIG. 5 is pressed against the ink film, effective, complete electrical connections between the recording styluses and the resistive layer are produced. As shown in FIGS. 5 and 6, the only electrodes used for recording are the recording styluses, so that it is possible to bring each recording stylus into excellent contact with the resistive layer. Moreover, since each recording stylus is integral with the electrode substrate, problems such as damage to individual recording styluses are eliminated, resulting in high reliability.

The basic recording method of the invention and a gray scale recording method using the above-described recording head are now described.

FIG. 7a depicts the current flow 42 in a resistive layer, and includes an area 40 at the point of contact with a recording stylus to which a relatively low voltage is applied and a similar area 41 in contact with a recording stylus adjacent to the first one to which a relatively high voltage is applied. The resulting temperature distribution depends on the conduction time; see curves 43 and 44 in FIG. 7b. Curve 43 represents the condition where the conduction time is shorter and curve 44 represents the condition where it is longer. The area of transferred ink which results is represented by areas 45 and 46 of FIG. 7c; the inked area is modulated in this way.

FIG. 8 shows a switching circuit for connecting to multiple adjacent stylus electrodes. Switches 50 in the positive side of a power source 8 and switches 51 in the negative side of it connect alternative ones of stylus electrodes $H_1 - Hm$ and $L_1 - Lm$. The number of the stylus electrodes are $2m$ and the number of recording picture elements produced is $2m-1$ (m is a positive integer). Hereinafter the switches in the negative side are referred to as low-level or L switches and the switches in the positive side are high-level or H switches; the stylus electrodes connected to the negative (low) potential are the L electrodes and the stylus electrode connected to the positive (high) potential are the H electrodes. In use, referring to electrode $H_1$, picture elements are formed between $H_1$ and $L_1$ and $H_1$ and $L_2$ by current flowing between $H_1$ and $L_1$ and $H_1$ and $L_2$, respectively. Picture elements are formed between pairs of L and H electrodes in the same way.

FIG. 9 shows an equivalent circuit of the $k_{th}$ L electrode in the prior art structure of FIG. 4. An equivalent resistance 52 lies between the $L_k$ electrode and all the H electrodes, and the current flow varies in dependence upon which H switches are turned on or off. This structure has the previously stated disadvantages. The present inventive solution to the problems of the circuit is illustrated in FIG. 10, following which improvements flowing from the present invention will be explained.

Figure 10A:
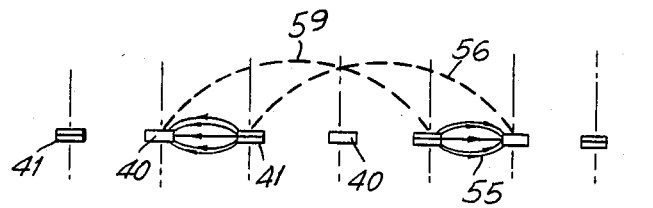
FIGS. 10a and 10b show switching state and equivalent circuits of the apparatus of the invention when used in one embodiment of the invention.
Figure 10B:
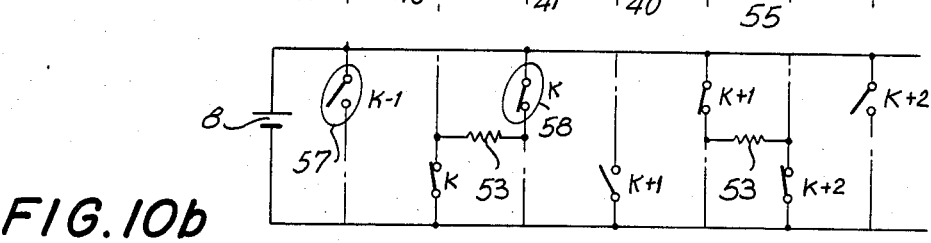
Figure 11A:
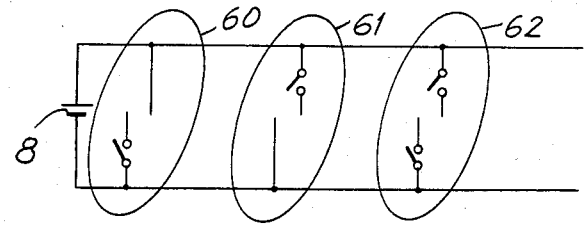
FIG. 11 show a manner of controlling the closing and opening of the switches of the invention to produce picture elements.
Figure 11B:
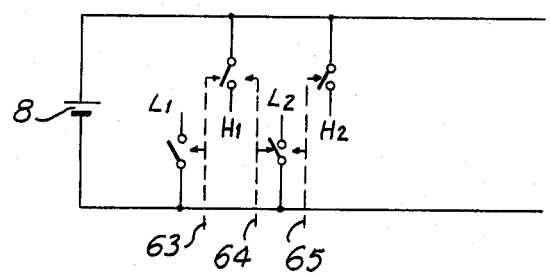
Figure 12A:
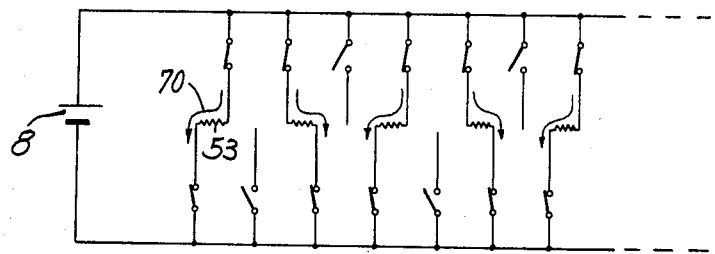
FIGS. 12a, 12b and 12c show a switching sequence in which a full line of picture elements is formed.
Figure 12B:
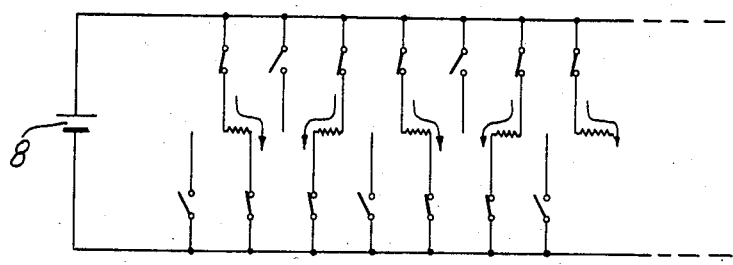
Figure 12C:
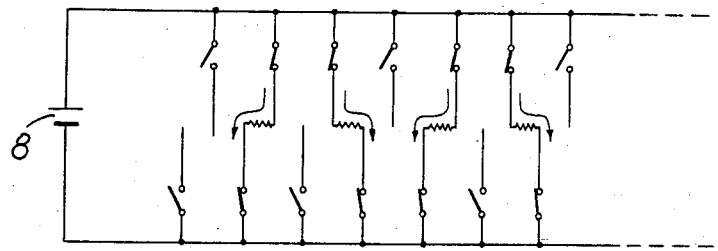

In FIG. 10a, the direction of current flow between activated styluses is shown by the arrows. FIG. 10b shows the equivalent circuit. The potentials of electrodes 40 and electrodes 41 depend on which switches are opened or closed, as shown in FIG. 10b. An open switch is indicated at 57 and a closed switch is indicated at 58. As shown, electrodes 41 are H and electrodes 40 are L, and current flows as indicated by arrows by 54 and 55. Significant current flow along the paths indicated by dashed lines 56 and 59 does not occur. Accordingly, only the equivalent resistances 53 are shown in FIG. 10b and the current flow is determined by the resistance between adjacent electrodes. The equivalent circuit of FIG. 10b is applicable only when the current flow indicated by arrows 54 and 55 is directed oppositely. Also, in order to realize the equivalent circuit of FIG. 10b, the period of time when H switches are closed must be equal to the period of time when L switches are closed. For example, the current flow 59 is generated when the $k_{th}$ H switch and the $k_{th}$ L switch are both closed, the $(k+1)_{th}$ H switch is closed, and the $(k+2)_{th}$ L switch is opened. Thus, instead of providing a switch for connecting adjacent styluses to either one or the other side of the power source such as switches 60 and 61 of FIG. 11, it is necessary to provide switches for connecting alternate styluses to one and to the other side of the power source in the manner shown by switches 62 of FIG. 11a. Also, H and L switches of adjacent styluses must open or close together, e.g. in response to the same signal, as shown in FIG. 11b. In FIG. 11b, dashed lines 63, 64 and 65, respectively, represent signals for activating switches L1 and H1, H1 and L2, and L2 and H2, respectively; the application of the signals 63, 64 and 65, to close the paired switches occurs at different times. When using the recording method of FIG. 10, one-third of all the picture elements in a line are formed simultaneously and a full line of picture elements is formed by recording at three successive times, as shown in FIG. 12. By opening or closing the switches as shown in FIGS. 12a, 12b and 12c, the current 70 is made to flow in sequence a, b, c through the equivalent resistances lying between adjacent recording styluses, so that a line of picture elements can be wholly formed.

Figure 13A:
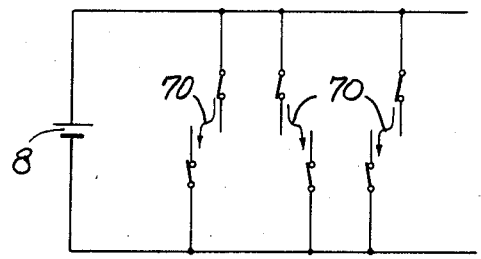
FIGS. 13a and 13b illustrate a characteristic of the switching system of FIGS. 10–12.
Figure 13B:
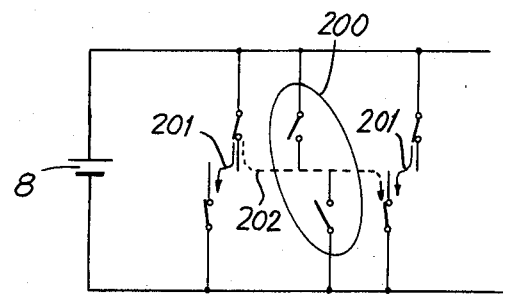

Cross-talk resulting from the above-described method is described in connection with FIG. 13. In FIG. 13a, only the switches of FIG. 12a which are closed to form the three leftmost picture elements are shown. FIG. 13b shows the case in which the middle of three picture forming elements is not activated, switches 200 being open; the principal current flow is then as indicated by arrows 201 and a secondary current flow by arrow 202. The amount of current in arrow 201 is slightly smaller than that of arrow 70 (FIG. a), and the amount of current in arrow 202 is about 8–10% of that of arrow 201. When two-level printing is performed, this crosstalk can be ignored. However, when gray scale printing is performed, the crosstalk causes more or less of a problem, depending on the number of the gray scale. It is desirable that this crosstalk be as small as possible.

The above problem is solved, in accordance with the present invention by dividing the n picture elements, counting from one end of a line of picture elements, into N picture element groups, and the reproduction process is represented as $N \times J + N$, where J is 0, 1, 2, 3, ... (n/N − 1) and N is an odd number greater than 3.

The total number of group printings required to form the n picture elements is N. J specifies the particular group of spaced-apart electrodes in the line of n electrodes. By making N an odd number greater than 3, a plurality of picture elements can be formed simultaneously. Cross-talk can be reduced by increasing N. However, as N becomes larger, the number of picture elements which can be formed simultaneously becomes smaller. When choosing N, therefore, it is desirable to select the best value taking the above two points into consideration.

Figure 14A:
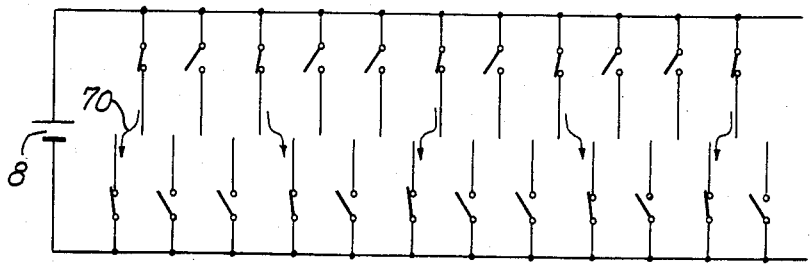
FIGS. 14a and 14b show an improved switching arrangement in accordance with the present invention.
Figure 14B:
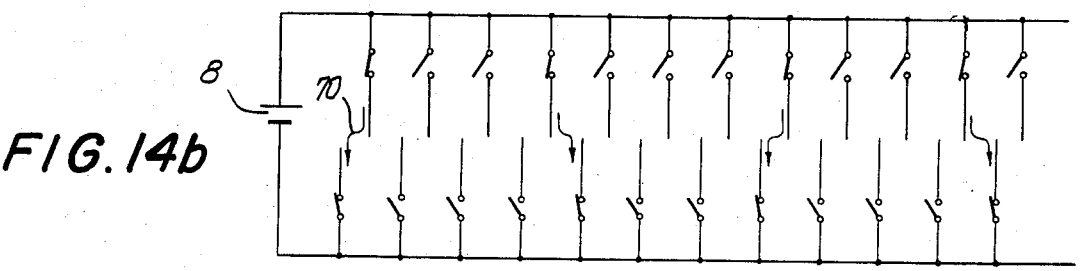
Figure 15A:
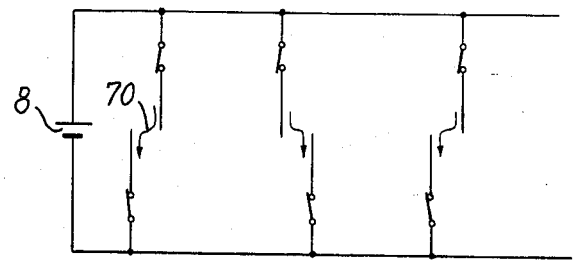
FIGS. 15a and 15b illustrate the flow of reduced crosstalk current in the arrangement of FIG. 14.
Figure 15B:
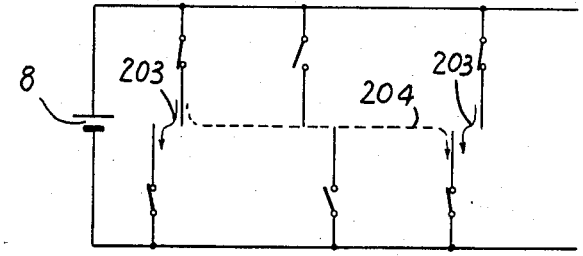

FIG. 14a illustrates the opening and closing of switches for the case N=5; FIG. 14b illustrates the opening and closing of switches for the case N=7 and corresponds to FIG. 12a. FIG. 15a shows only those switches which are closed and FIG. 15b shows the middle switch as open. In the latter case, the current flows in the same way as shown in FIG. 13b. However, the amount of crosstalk current 204 is greatly reduced, being about 2–4% in case of N=5, and about 1–2% in case of N=7. Crosstalk current is reduced as N becomes larger, and thus gray scale resolution for gray scale printing is improved.

In the following, concrete embodiments of the printing apparatus suitable for carrying out the invention in different cases are described. The following description refers to the case of N=5 (FIGS. 19-27).

Figure 16:
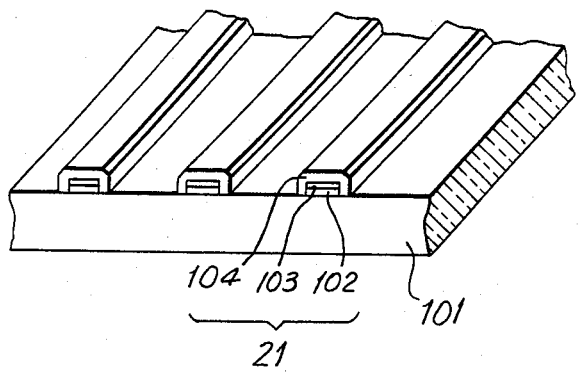
FIGS. 16 and 17 are perspective and schematic representations, respectively, of a portion of an improved recording head useful with the present invention.

FIG. 16 shows an end portion of a recording head fabricated in accordance with the teachings of the invention and which is useful in all of the illustrated embodiments. A nickel-chromium layer 102 and a copper layer 103 are deposited on a ceramic substrate 101, being photo-etched chemically to form electrodes. A nickel-tungsten-phosphor layer is then selectively coated on the electrodes by electroless plating. In the schematic electrode assembly of FIG. 17, there are 320 L electrodes and 320 H electrodes (L1-L320 and H1-H320) for a total of 640 styluses. Thus 639 picture elements can be formed (P1-P639 in FIG. 17). The pitch P of the stylus electrodes (FIG. 17) is 200 micrometers. This recording head is used with the carrier system of ink transfer sheet and ink film which is shown in FIG. 6. The ink film is wound into a roll and may include colored ink as shown in FIG. 18. The fusible ink of yellow 111, magenta 112 and cyan 113 color is deposited on an ink support layer which has resistive layer 110 on the back side.

Figure 19:
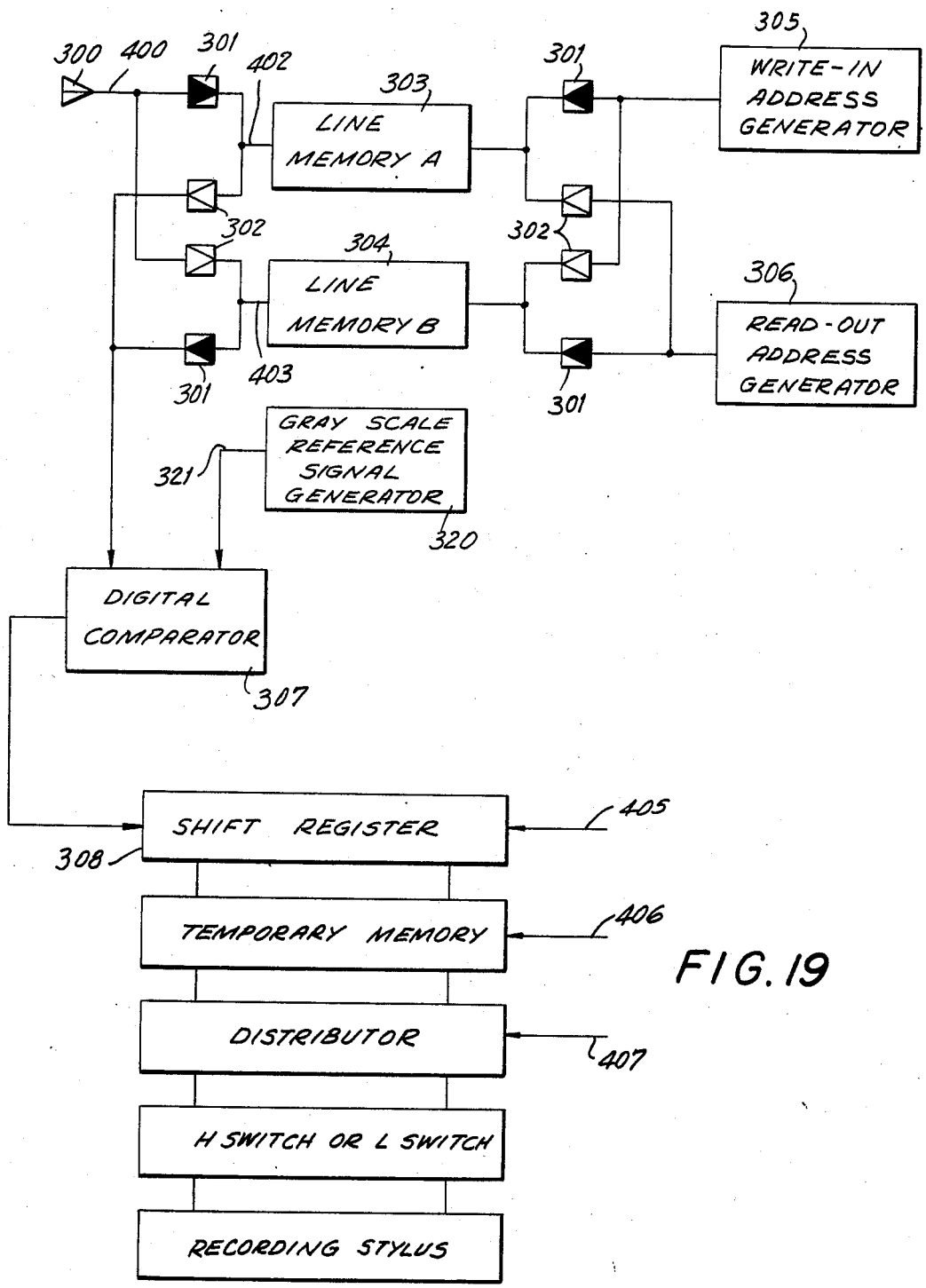
FIG. 19 is a block diagram of a switch control circuit useful in the printing apparatus of the present invention.

FIG. 19 is a block diagram of a circuit useful with the printing apparatus of the present invention. A line of picture image signal is inputted at terminal 300, passing through switch 301 or switch 302 to be stored in line memory A or line memory B at an address generated in and supplied by write-out address generator 305. The stored picture image signal is read when called for by an address from address generator 306, and fed to digital comparator 307. There it is compared with a reference signal 321 from gray-scale reference signal generator 320. The result of the comparison is put into shift register 308 at a signal 405 from a shift clock. The signal is transmitted thence to temporary memory 309 by latch clock signal 406, and is subsequently delivered by distributor 310 to an H switch or an L switch in response to record sequence selecting signal 407. Recording voltages are thus delivered to the respective recording styluses.

The signal flow having been outlined above, details will now be explained. In connection with the relationship between input and output picture image signals shown in FIG. 23, pulse signal 404 is applied to switches 301 and 302 and has an inverted line period TL. Input picture image element signal 400 comprises a signal corresponding to 640 picture elements, and is transmitted in a period TW. The storage of the elements of the input picture image signal in either line memory A or line memory B (here memory A) is controlled by an address signal from write address generator 305 and corresponds with the open or the closed state of either one of switch 301 and 302. Meanwhile, an output picture image signal 403 is being read out of line memory B in response to an address signal from read address generator 306. The output signals from line memories A and B are designated 402 and 403, respectively. Signals 400-403 are signals in parallel.

Write addresses and read addresses are obtained as follows. Table 1 shows the addressing of 640 signal elements by means of coordinates a1—a138 and b1—b5. Table 2 shows the sequence of write addresses. Input picture image element signals are taken in serial order and are stored in line memory A or B according to the sequence shown in Table 2. With the numbering of input picture image element signals being 1 to 640, picture image element signal 1 is stored at address 0, picture element signal 2 is stored at address 128, picture element signal 3 is stored at address 256; to picture element signal 639 which is stored at address 511. Last picture element signal 640 is stored at address 639. Read addresses a1 through a128 vary, in order, along each block line b1 to b5, with the address being read 16 times for each block, since picture image signals of 4 bits having 16 gray scale signals are used in this embodiment. For dynamic printing, the addresses are divided into five blocks b1-b5, in accordance with the teachings of the invention. Thus to form the signals for recording, the picture elements are divided in serial order into five groups represented as $5J+1, 5J+2, \ldots, 5J+5$, where J is $0, 1, 2, \ldots, 128$. Thus, the arrangement of picture image signals is converted by write and read addresses. According to the present (N=5) embodiment, the write addresses are divided into five blocks. Read-out by dividing into blocks conversely is permitted.

TABLE 1

|    | a1  | a2  | a3  | a4  | a5 | ... | ... | a127 | a128 |
|----|-----|-----|-----|-----|----|-----|-----|------|------|
| b1 | 0   | 1   | 2   | 3   |    |     |     | 126  | 127  |
| b2 | 128 | 129 | 130 | 131 |    |     |     | 254  | 255  |
| b3 | 256 | 257 | 258 | 259 |    |     |     | 282  | 283  |
| b4 | 284 | 285 | 286 |     |    |     |     | 510  | 511  |
| b5 | 512 | 513 | 514 |     |    |     |     | 638  | 639  |

TABLE 2

|    | a1 | a2 | a3 | a4 | a5 | ... | ... | a127 | a128 |
|----|----|----|----|----|----|-----|-----|------|------|
| b1 | 1  | 6  | 11 | 16 |    |     |     | 631  | 636  |
| b2 | 2  | 7  | 12 | 17 |    |     |     | 632  | 637  |
| b3 | 3  | 8  | 13 | 18 |    |     |     | 633  | 638  |
| b4 | 4  | 9  | 14 |    |    |     |     | 634  | 639  |
| b5 | 5  | 10 | 15 |    |    |     |     | 635  | 640  |

In the circuit of FIG. 9, the picture image signal 403 is read out of memory and is fed into digital comparator 307 where it is compared with reference signal 321 from gray-scale reference signal generator 320. A two-level comparison signal of "0" or "1" results. Picture image signals a1-a128 are read 16 times per block while reference signal 321 varies from 0 to 15 per time signal. Thus, picture image signal 401 is compared with reference signal 321 for a total of $128 \times 16$ times, which is the period of TRA 413 in output picture image signal 401 (FIG. 23) and is equal to one-fifth of line period TL. The resulting two-level comparison signal is transmitted to shift register 308.

Figure 20:
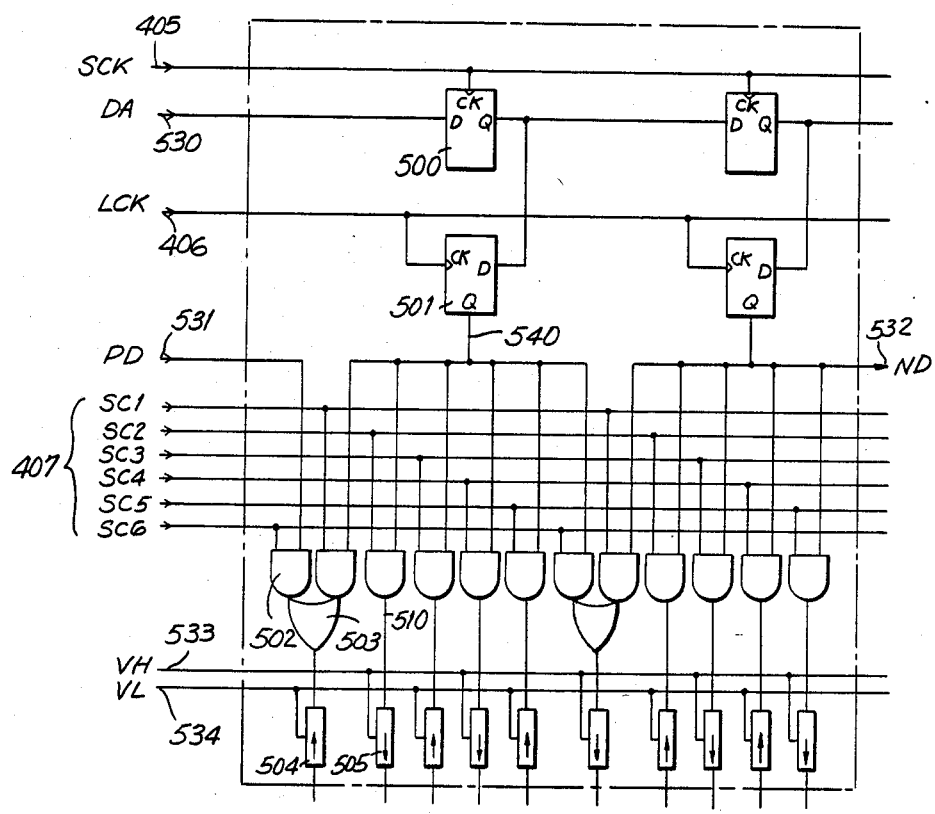
FIG. 20 is a circuit diagram of shift register for operating the stylus switches of the invention.
Figure 24:
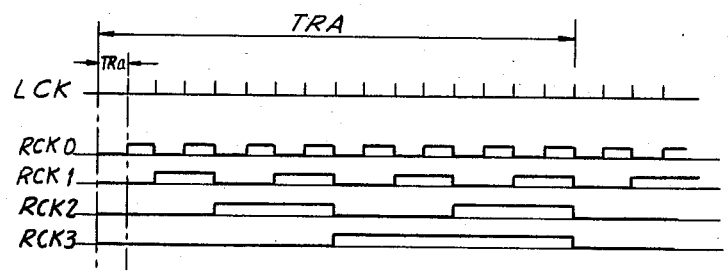

FIG. 20 is a block diagram of shift register 308 and the succeeding circuits for actuating five of the H switches and five of the L switches. In this embodiment, sixty-four circuit parts are connected in cascade or in parallel. D-type flip-flop 500 is used as shift register element and D-type flip-flop 501 is used for temporary memory; signals are read at the rising of shift clock signal (SCK) 405 and latch clock signal (LCK) 406, respectively. The period of SCK is TRA/$(128 \times 16)$ so that the read address varies minimally, the period of LCK is TRA/16 (FIG. 24). Gray value signal 321 has 4-bit reference clock (RCK) signals 0-3, RCK 0 being the lowest bit and RCK 3 the highest. Reference signal 321 varies from 0 to 15 with the period of TRA (FIG. 24) during the period TRa, which is repeated. During the period TRa, one block of picture image signals a1-a128 is outputted and compared. The period of latch clock 406 is TRa, and the period of shift clock 405 (FIGS. 19 and 20) is the same as that during which the above picture image signal from comparator 307 is outputted.

The two-level comparison signal is fed into DA terminal 530 (FIG. 20) on the first step, and shifted, in sequence, to the next step by shift clock signal 405. The two-level comparison signal from comparator 307 is transmitted on the after-step of latch clock LCK 406 to D-type flip-flop 501 for temporary storage for the period TRa. At this time, the pulse width of the two-level comparison has been converted, by passage through the shift register and the temporary memory, to pulse width picture image signal 540 on the output of flip-flop 501. Picture image signal 540, as directed by record sequence selecting signal 407 and logic elements 502, 503, simultaneously opens or closes L switch 504 and H switch 505. Logic element 502 is an AND gate and logic element 503 is an OR gate. Signals PD 531 and ND 532 occur between the before-step and the after-step. VH 533 is connected to a source of relatively high voltage, and VL 534 is connected to a source of relatively low voltage.

Figure 21:
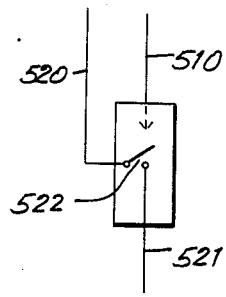
FIGS. 21 and 22a and 22b show the construction of the high potential and the low potential switches used in the invention.
Figure 22A:
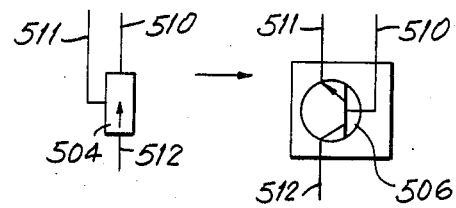
Figure 22B:
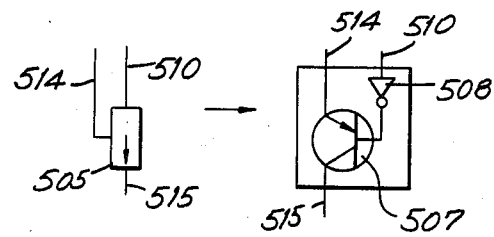
Figure 23:
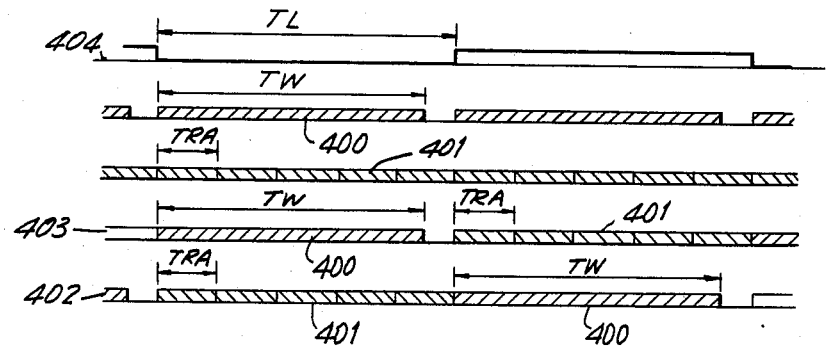

The nature of the L switch and the H switch of the invention is described in the following, referring to the FIGS. 21 and 22. In FIG. 21, switch 522, representing either an L switch or an H switch, is opened (or closed) by switching control signal 510 so that the potential carried on power source line 520 is applied to output terminal 521. FIG. 22a shows an L switch in the form of NPN transistor 506 where the low potential input 511 is outputted at terminal 512 by switching control signal 510. FIG. 22b shows an H switch in which NPN transistor 507 is fed the control signal is fed the control signal via inverter 508 and a high potential from source 514 is outputted on lead 515.

Figure 25:
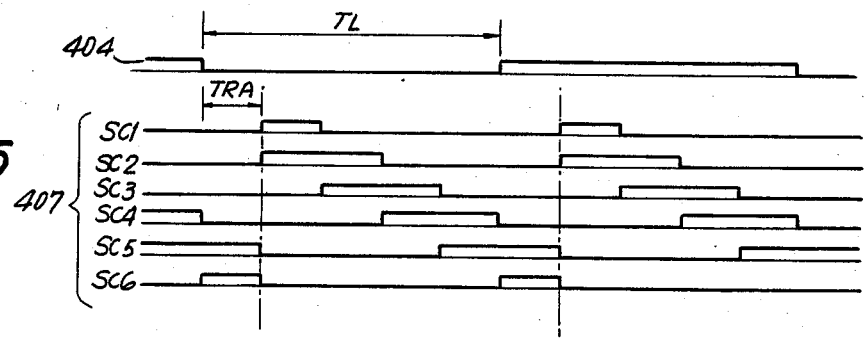

FIG. 25 is a timing diagram of the record sequence selecting signals 407 (SC1 through SC6) which are fed to distributor 310 (FIG. 19). SC1 lags behind signal 404 by approximately the period TRA 413 to allow changing over between line memories A and B. This lag results from the delay of switching control signal 510 for the period TRA by passing through shift register 308 after the output picture image signal is read from line memory A or B. Record sequence selecting signals SC1 through SC6, respectively, open or close L switches and H switches, in sequence, with a pulse width which is controlled by the pulse width picture image signal 540 in accordance with the write address sequence shown in Table 2.

The printing of a television picture has been performed by using the above-described carrier system of recording head and fusible ink film along with the driving circuit just described. The television picture image signal was converted from analog to digital form, there being subsequently stored in memory one frame of $640 \times 480 \times 3$ colors. It was then fed to input terminal 300 (FIG. 19). The speed of printing was 8.3 milli-seconds for forming one line of picture element. The 480 lines of the whole picture were printed in 4 seconds, using ink of yellow, cyan and magenta colors at a speed $TL = 8.3$ milli-seconds and $TRA = 1.66$ milli-seconds. The printed picture image obtained was of almost the same picture quality as that of the television (CRT) picture screen. FIG. 26 illustrates a part of such a printed picture image, in which the arrows 600 indicate the positions of the center of several recording styluses. Picture elements 601 are formed between the recording styluses. Motion of the ink film and the ink transfer paper resulted in formation of the picture elements on oblique lines so that picture images without scanning lines, the same as on the CRT, could be obtained.

The following is a description of another embodiment of the invention in which $N=7$. The construction is, on the whole, almost the same as that of the previous embodiment. However, the number of recording styluses, the number of picture image element signals, etc., are different because $N=7$. Only differing points of construction will be described in the following.

There are 315 each recording styluses L electrodes and the H electrodes, adding up to 630 pieces. There are 629 picture elements. The write addresses sequences are shown in Tables 3 and 4.

Table 3 shows 630 storage addresses formed using coordinates a1–a90 and b1 through b7. Table 4 shows the write address generating sequence. The addresses are divided into seven groups to which second sequence selecting signals SC1–SC8 correspond, as shown in FIG. 27.

Printing of the television picture was performed using the above printing apparatus with the frame of a television picture image signal of $640 \times 480 \times 3$ colors being stored in memory in the same manner as that of the embodiment in which $N=5$. In using line memory A or B, only 630 of 640 picture elements were stored for each line. Printing was performed at a speed giving a formation time for a line of picture elements of 8.3 m seconds; that is, $TL = 8.3$ milli-seconds and $TRA = 1.19$ milli-seconds. A printed picture image of a very superior resproductive quality was obtained.

TABLE 3

|    | a1  | a2  | a3  | a4  | a5 | ... | ... | a89 | a90 |
|----|-----|-----|-----|-----|----|-----|-----|-----|-----|
| b1 | 0   | 1   | 2   | 3   | 4  |     |     | 88  | 89  |
| b2 | 90  | 91  | 92  | 93  |    |     |     | 178 | 179 |
| b3 | 180 | 181 | 182 | 183 |    |     |     | 268 | 269 |
| b4 | 270 | 271 | 272 |     |    |     | •   | 358 | 359 |
| b5 | 360 | 361 | 362 |     |    |     |     | 448 | 449 |
| b6 | 450 | 451 | 452 |     |    |     |     | 538 | 539 |
| b7 | 540 | 541 | 542 |     |    |     |     | 628 | 629 |

TABLE 4

|    | a1 | a2 | a3 | a4 | a5 | ... | ... | a89 | a90 |
|----|----|----|----|----|----|-----|-----|-----|-----|
| b1 | 1  | 8  | 15 | 22 | 29 |     |     | 617 | 624 |
| b2 | 2  | 9  | 16 | 23 | 30 |     |     | 618 | 625 |
| b3 | 3  | 10 | 17 | 24 | 31 |     |     | 619 | 626 |
| b4 | 4  | 11 | 18 |    |    |     |     | 620 | 627 |
| b5 | 5  | 12 | 19 |    |    |     |     | 621 | 628 |
| b6 | 6  | 13 | 20 |    |    |     |     | 622 | 629 |
| b7 | 7  | 14 | 21 |    |    |     |     | 623 | 630 |

Figure 28:
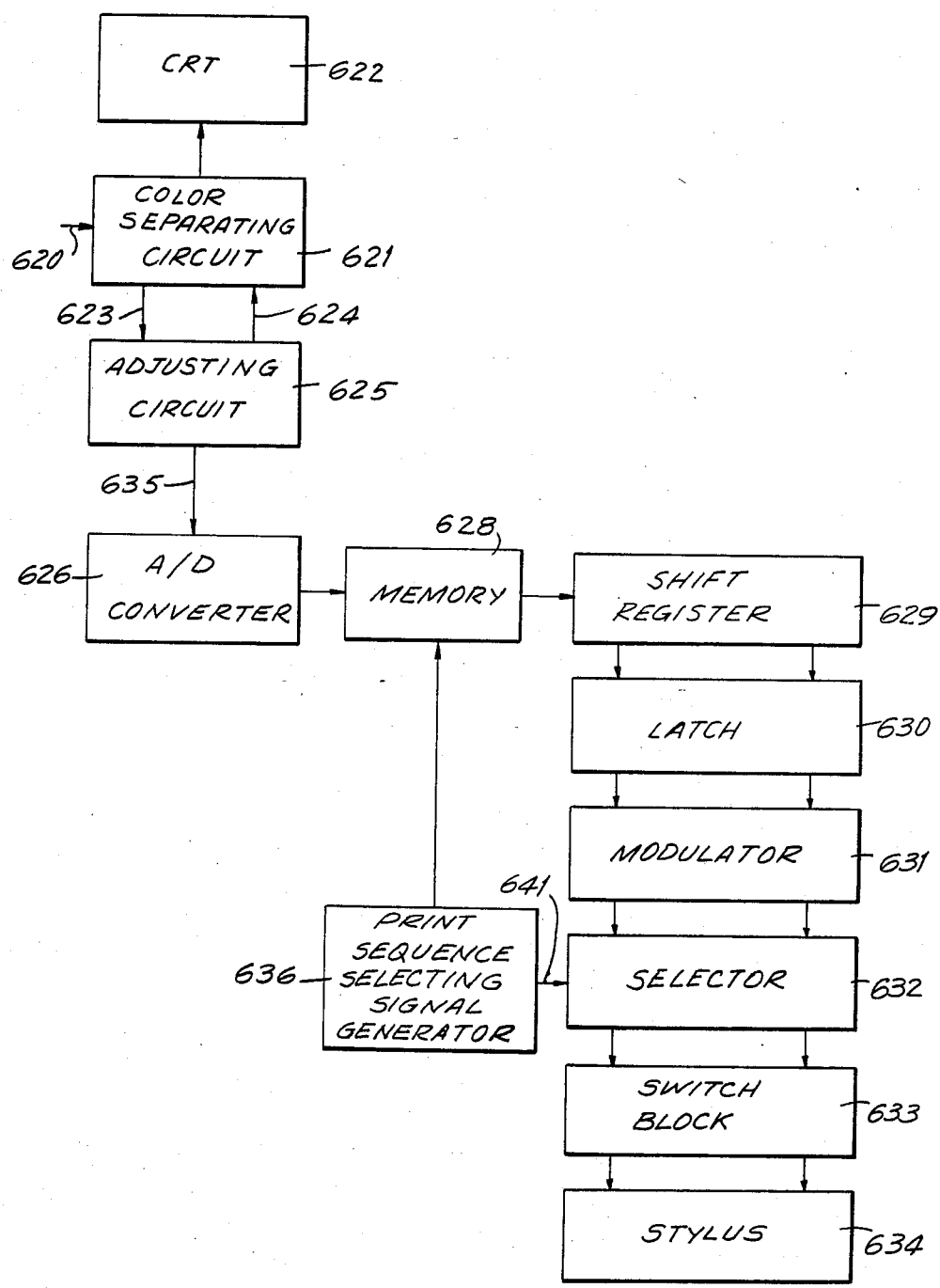
FIG. 28 shows a block diagram of another embodiment of the present invention.
Figure 29:
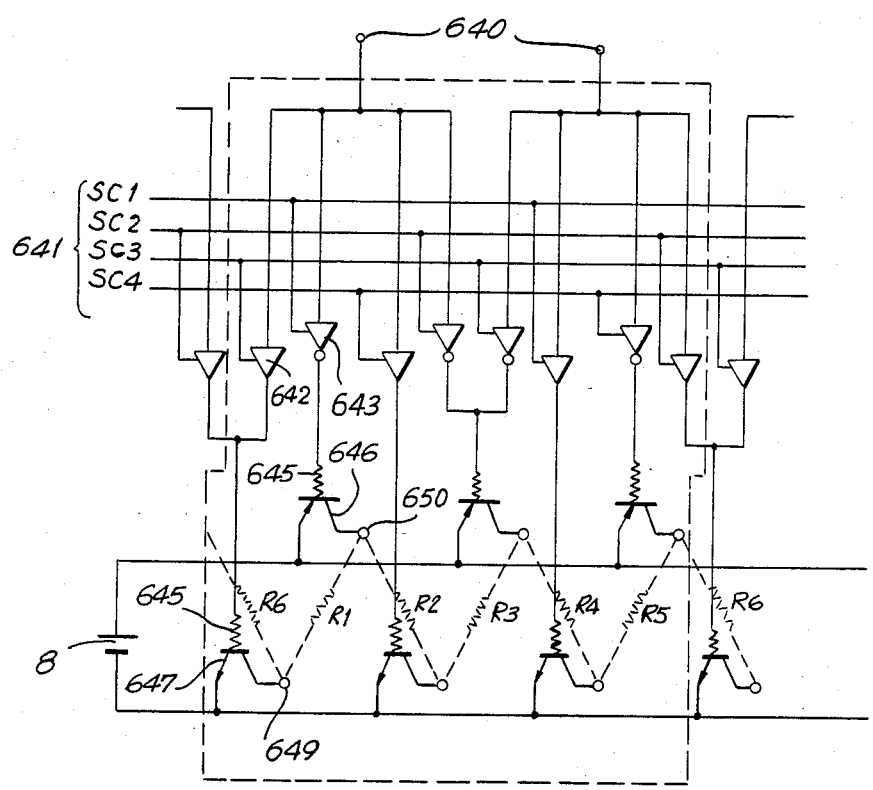
FIGS. 29 and 30 illustrate the selector and switching circuits, respectively, useful in the embodiment of FIG. 28.
Figure 30:
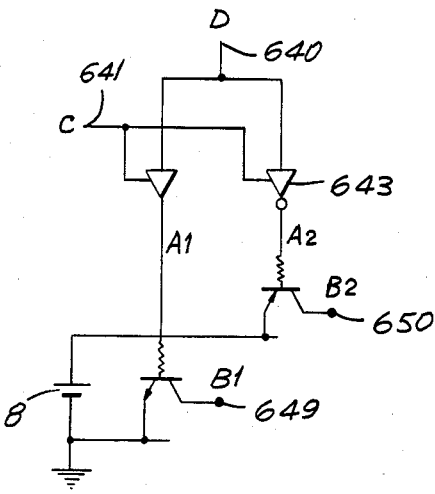

Another circuit configuration, shown in FIGS. 28–30, is useful for the case $N=3$.

In block diagram of FIG. 28, a video signal 620 is input into a noise-processing and color-separating circuit 621 and displayed at CRT 622. An R, G, B signal 623 from the color separating circuit is fed into an adjusting circuit 625 to correct for the inverse gamma and for the difference in color balance between the CRT and the printing apparatus. The resulting adjusting signal 624 is returned to the circuit 621 and the signals are monitored on CRT 622. In adjusting circuit 625, the signals are corrected to be printed in a color tone which is displayed on the CRT. A corrected signal 635 is converted to 6 bit data in an analog-to-digital converter 626 and temporarily stored in linememory 628. Line memory 628 delivers a signal to shift register 629 in response to a signal from a print sequence selecting signal generator 636 wherein 636 dots from one scanning line are sampled. Shift register 629 has 612 steps of 6 bits in parallel, the number of steps being one-third of the number 636 obtained by adding 1 to the number of picture elements 635 in one line.

Line memory 628 outputs the signals to shift register 629 three times. The signals transmitted to shift register 629 are each memorized in latch circuit 630, and the pulse width is varied in accordance with the input data in modulator circuit 631. Then, in selector 632, this signal is converted to a signal for opening or closing a switch in block 633 for each stylus electrode 134. Selector 632 distributes the pulse-width-modulated data to each switch 633 in response to a record sequence selective signal 641 from print sequence selecting signal generating circuit 636.

FIG. 29 is a schematic circuit diagram of the selector and the switches. The pulse-width-modulated data is fed into a terminals 640 and is distributed to switches 646 and 647, respectively, in accordance with the record sequence selecting signal on lines SC1–SC4. From lines SC1–SC4 the signals flow through noninverting buffers 642 and inverting buffers 643 which deliver a tristate output. Each signal then travels, via a limiting resistor 645, to PNP-take transistor 646, which is an H switch or to NPN-type transistor 647 which is an L switch. Resistors R1–R6 are equivalent resistances appearing in the resistive layer of the ink film during operation.

FIG. 30 and Table 5 show a fundamental logic circuit and a log table, respectively, in which "0" and "1" in the table 1 represent L-level and H-level, respectively, in a logical way. "HZ" represents a high impedance state.

TABLE 5

| D | C | A1 | A2 | B1 | B2 |
|---|---|----|----|----|----|
| 0 | 0 | HZ | HZ | HZ | HZ |
| 1 | 0 | HZ | HZ | HZ | HZ |
| 0 | 1 | 0  | 1  | HZ | HZ |
| 1 | 1 | 1  | 0  | ON(0) | ON(1) |

TABLE 6

|  | t1 | t2 | t3 |
|---|----|----|----|
| SC1 | 1 | 1 | 0 |
| SC2 | 0 | 0 | 1 |
| SC3 | 1 | 0 | 0 |
| SC4 | 0 | 1 | 1 |
| selected | R1 | R2 | R3 |
| picture element | R4 | R5 | R6 |

As shown in Table 5, the output B1 (from terminal 649) of an L switch and the output B2 (from terminal 650) of an H switch are turned on so that current flows from B2 to B1 (FIG. 30) when D and C are in the state of "1".

Table 6 shows the recording sequence selecting signals 641 (SC1–SC4) used in FIG. 29. The signals are distributed to each switch at three times t1, t2, and t3. At time t1, current flows through equivalent resistances R1 and R4 of the ink film of FIG. 29. At times t1, t2, and t3, the control signals of table 6 are energized as shown in FIGS. 12a, b and c, to form all the picture elements in one line. The gray-scale recording is performed by controlling the period of time of current flow in accordance with the pulse width of the data signal fed to input terminal 640. As to selector 632 and switch block 633 of FIG. 28, it is to be noted that the circuit represented by the block within the dashed line of FIG. 29 has 106 sections. Thus, equivalent resistance R1 of the first section corresponds to picture elements P1 of FIG. 17 and the resistance R5 of the 106th section corresponds to picture element P635. (In this embodiment, recording styluses L1–L318 and H1–H318 are utilized.)

Using the above described recording head, ink film carrier system, and signal processing and driving circuit, the printing of a television picture was performed. The equivalent resistance value of the resistive layer of ink film was 4K ohm. The printing of a stopped television picture of 480 lines was completely effected in 4 seconds usuing fusible printing ink of yellow, magenta and cyan colors, with an applied voltage of 20 V as power source 8. It took 8.3 milliseconds to form a line of picture elements and the maximum pulse width was 2.7 milliseconds (2.7 milliseconds × 3 times - milliseconds). As to the printed image, almost the same picture quality as that of the CRT picture screen was obtained in an image size of 96 × 127 mm. The recording energy of the largest picture element was 0.3 mJ (the dot size is about 0.2 × 0.2 mm when the pulse width is 2.7M milliseconds). When printing all of the picture at maximum intensity, a current of about 1 A flowed simultaneously and the total electric power for recording was about 20 W. This energy is between one-fifth and one-seventh that of the thermal transfer method using the conventional thermal head.

Figure 17:
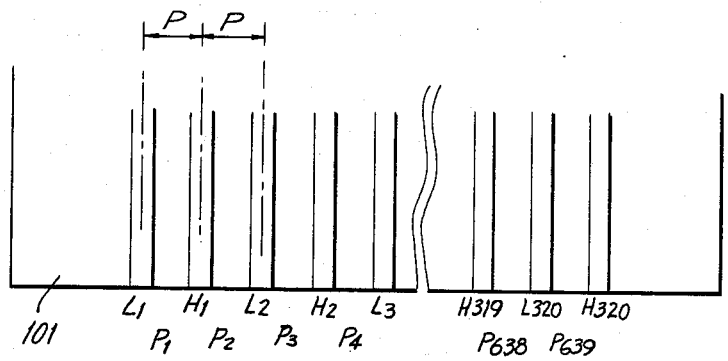
Figure 18:
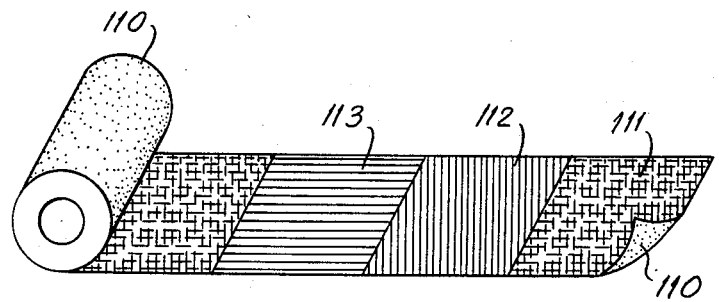
FIG. 18 is a view of a color ink film used with the printing apparatus of the present invention.
Figure 31:
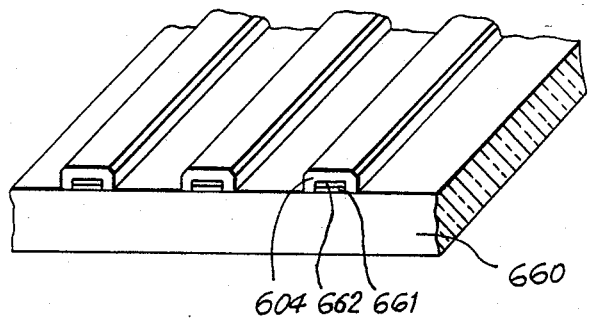
FIG. 31 is a perspective view of another recording head in accordance with the invention.

A second embodiment of a recording head according to the invention is shown in FIG. 31; it has the same schematic plan as that of FIG. 17. Now, a first copper layer 661 is coated on a glassepoxy substrate 660 by electroless plating. A second, electric coated later of copper 662 was formed thereon and photo-etched chemically to make electrodes. The oxide film on the electrode was then eliminated by means of an approximately 5% dilute sulfuric acid solution, followed by soaking in a palladium chloride solution before rinsing. By means of a nickel-tungsten-phosphorus (Ni-W-P) plating solution, plated layer 604 of Ni-W-P was formed on copper electrodes 661, 662, etc. When used to print in the same way as the recording head of FIG. 16, almost the same recording characteristics were obtained in so far as picture quality is concerned.

The recording head could be used with higher electric powers up to approximately three times that normally required for continuous printing without separation of the recording styluses from the glass-epoxy substrate. Compared to the recording head on the ceramic substrate which can operate at the higher rates, there is a substantial advantage in using the recording head on the glass-epoxy substrate in that a picture image of good quality can be obtained at a much lower cost.

As described above, the present invention provides a color picture image printing apparatus which is very economical and which allows the copying of color television pictures. The invention is characterized by its ability to record at high speeds by its simple recording head construction, by its capability of gray-scale recording in which low and high potential electrodes are paired, and by the low energy required to drive the small load presented by the recording circuit.

It will thus be seen that the objects set forth above, among those made apparent from the preceding description, are efficiently attained and,since certain changes may be made in the above constructions without departing from the spirit and scope of the invention, it is intended that all matter contained in the above description or shown in the accompanying drawings shall be interpreted as illustrated and not in a limiting sense.

It is also to be understood that the following claims are intended to cover all of the generic and specific features of the invention herein described and all statements of the scope of the invention which, as a matter of language, might be said to fall therebetween.

What is claimed is:

1. An electrothermal printing apparatus for use in melting and transferring fusible ink from an ink film having a layer of fusible ink and a resistive layer to a transfer sheet to form elements of a picture, the printing apparatus comprising:
   recording head means having a plurality of recording styluses disposed in spaced relation in a line;
   switch means equal in number to the number of styluses, there being a switch means for each stylus, the switch means of every other stylus in the line of styluses being adapted to connect the associated stylus to a potential from a power source, the switch means of each of the remaining styluses being adapted to connect the associated stylus to a different potential from the power source so as to permit the establishment of a potential difference between adjacent styluses; and
   means for simultaneously closing the switch means of at least one pair of adjacent styluses to apply a potential difference therebetween when the styluses are in contact with the resistive layer, whereby an electric current will flow between energized styluses which are in contact with the resistive layer, heating the portion of the fusible ink layer between the energized styluses and causing it to melt.

2. The electrothermal printing apparatus of claim 1 in which the potential difference is established between at least two pairs of styluses, while leaving at least one stylus between the energized pairs which is not so energized.

3. The electrothermal printing apparatus of claim 1 and further comprising:
   means for controlling the current flow in the resistive layer which results from the applied potential difference so as to melt a predetermined area of the fusible ink, whereby an element of a picture may be reproduced in gray-scale.

4. The electrothermal printing apparatus of claim 3 wherein the means for controlling the current flow controls the period of time for which the resistive layer is energized to control the area of fusible ink which is melted.

5. The electrothermal printing apparatus of claim 1 and further comprising:
   means for controlling the duration of application of the potential difference to the resistive layer so as to control the area of the ink film which is melted, thereby producing a picture element of controlled size useful in gray-scale reproduction.

6. The electrothermal printing apparatus of claim 1 in which the ink film has separate areas containing fusible inks of different colors and further comprising:
   means for selecting a pair of recording styluses to be energized when contacted by a fusible ink of a predetermined color so as to transfer fusible ink of the predetermined color to a transfer sheet as a picture element.

7. The electrothermal printing apparatus of claim 1 in which the ink film has separate areas containing fusible ink of different colors, and further comprising;
   means for energizing a first pair of adjacent recording styluses when they are in contact with a fusible ink of one color; and
   means for energizing a second pair of adjacent styluses when they are in contact with the second color, so as to produce picture elements of different colors on the transfer sheet.

8. The electrothermal printing apparatus of claim 1 for producing an image derived from a line of picture image signals, the apparatus further comprising:
   means for dividing a line of recording styluses capable of defining a line of n picture elements so as to define groups of picture elements, each group of picture elements consisting of N picture elements, the groups of picture elements being represented by $N \times J + 1$, $N \times J + 2$, ... $N \times J + N$, counting in order from one end of the line, $J = 0, 1, 2, \ldots (n/N - 1)$, and N is an odd number greater than 3; and
   means for selectively energizing the pairs of styluses in each group so as to permit the simultaneous production of a plurality of picture elements on the transfer sheet.

9. The electrothermal printing apparatus of claim 8 and further comprising:
   means for energizing other pairs of styluses in successive groups, the styluses being energized so that simultaneously printed picture elements are spaced by at least $N - 1$ picture element locations on the line of styluses.

10. The electrothermal printing apparatus of claim 8 in which $N = 5$.

11. The electrothermal printing apparatus of claim 8 in which $N = 7$.

12. The electrothermal printing apparatus of claim 8 in which the means for energizing the styluses in groups of styluses comprises:
    timing means providing a record sequence selecting signal; and
    distributor means responding to the record sequence selecting signal to close the switches in groups.

13. The electrothermal printing apparatus of claim 8 in which the means for energizing the pairs of styluses in groups of styluses comprises:
    a gray-scale reference signal generator having a reference signal as an output;
    comparator means having the gray-scale reference signal and the line of picture image signals as inputs and having a comparison signal as an output;
    timing means providing a record sequence selecting signal; and
    distribution means into which the comparison signal is fed, the distribution means responding to the record sequence selecting signal to close the switches in groups.

14. The electrothermal printing apparatus of claim 8 in which the means for energizing the pairs of styluses in groups of styluses comprises:
    a gray-scale reference signal generator having a reference signal as an output.
    comparator means having the gray-scale reference signal and the line of picture image signals as inputs and having a comparison signal as on output;
    temporary memory means for storing the comparison signal; and
    distribution means into which the comparison signals from the temporary memory means are fed, the distribution means responding to the record sequence selecting signal to close the switches in groups.

15. The electrothermal printing apparatus of claim 8 in which the line of picture image signals comprises a color television signal, and the apparatus further comprises:

adjusting means having the line of picture image signals as an input, the adjusting means having an output signal which is corrected for at least one of inverse gamma and a difference in color balance between the television display and the apparatus;

memory means for temporarily storing the corrected signals;

timing means providing a record sequence selecting signal; and distribution means into which the corrected signals are fed, the distributor means responding to the record sequence selecting signal to close the switches in groups.

16. The electrothermal printing apparatus of claim 15 in which the ink film comprises a multi-color ink film and the distribution means closes the switches in groups for energizing preselected pairs of styluses when those styluses are in contact with a predetermined portion of the ink film to produce picture elements of a selected color.

17. The electrothermal printing apparatus of claim 1 in which the recording head further comprises:

an insulating substrate having a surface and an edge on the surface; and the recording styluses comprise a plurality of elongate, parallel electrodes formed on the surface of the substrate.

18. The electrothermal printing apparatus of claim 17 in which each electrode extends to the edge of the substrate.

19. The electrothermal printing apparatus of claim 17 in which the insulating substrate comprises a ceramic.

20. The electrothermal printing apparatus of claim 17 in which the insulating substrate comprises a glass-epoxy.

21. The electrothermal printing apparatus of claim 2 in which the potentials applied to adjacent pairs of styluses in the line of styluses are such that there is no potential difference between the second stylus and the third stylus of the adjacent pairs, so that substantially no current flows in the resistive film along a straight line between the second stylus and the third stylus.

* * * * *